United States Patent
Wood

(10) Patent No.: US 9,481,962 B2
(45) Date of Patent: Nov. 1, 2016

(54) METHOD FOR TREATING TEXTILE MATERIAL FOR USE IN REINFORCED ELASTOMERIC ARTICLES

(75) Inventor: Douglas Wood, Lincoln, NE (US)

(73) Assignee: Veyance Technologies, Inc., Fairlawn, OH (US)

( * ) Notice: Subject to any disclaimer, the term of this patent is extended or adjusted under 35 U.S.C. 154(b) by 1064 days.

(21) Appl. No.: 12/029,044

(22) Filed: Feb. 11, 2008

(65) Prior Publication Data

US 2009/0199347 A1  Aug. 13, 2009

(51) Int. Cl.

| | |
|---|---|
| *D06M 15/227* | (2006.01) |
| *B32B 5/08* | (2006.01) |
| *C08L 23/16* | (2006.01) |
| *D06M 23/08* | (2006.01) |
| *B29B 15/10* | (2006.01) |
| *C08J 5/24* | (2006.01) |
| *D06M 15/693* | (2006.01) |
| *F16G 1/10* | (2006.01) |
| *B29K 23/00* | (2006.01) |

(52) U.S. Cl.
CPC ............ *D06M 23/08* (2013.01); *B29B 15/105* (2013.01); *C08J 5/24* (2013.01); *D06M 15/227* (2013.01); *D06M 15/693* (2013.01); *F16G 1/10* (2013.01); *B29K 2023/16* (2013.01); *C08J 2323/06* (2013.01); *Y10T 442/3301* (2015.04)

(58) Field of Classification Search
CPC ....... D06M 15/227; B32B 5/08; C08L 23/16
USPC ........ 8/115.51; 474/260, 263, 237; 525/192; 442/218
See application file for complete search history.

(56) References Cited

U.S. PATENT DOCUMENTS

| | | | |
|---|---|---|---|
| 2,582,366 A | | 1/1952 | White |
| 3,418,186 A | | 12/1968 | Wetzel |
| 3,900,663 A | | 8/1975 | Barabas et al. |
| 4,066,732 A | | 1/1978 | Redmond, Jr. |
| 4,283,455 A | | 8/1981 | McGee |
| 4,299,933 A | * | 11/1981 | McConnell et al. .......... 442/149 |
| 4,526,916 A | | 7/1985 | White |
| 4,685,987 A | | 8/1987 | Fick |
| 4,842,911 A | | 6/1989 | Fick |
| 5,102,604 A | | 4/1992 | Sidles et al. |
| 5,358,693 A | | 10/1994 | Brinkmann et al. |
| 5,482,756 A | | 1/1996 | Berger et al. |
| 5,858,140 A | | 1/1999 | Berger et al. |
| 5,905,106 A | | 5/1999 | Prigent et al. |
| 6,036,800 A | * | 3/2000 | Corvasce ............ B60C 1/0016 152/209.4 |
| 6,251,977 B1 | | 6/2001 | Georget et al. |
| 7,041,021 B2 | | 5/2006 | Gibson et al. |
| 7,134,953 B2 | | 11/2006 | Reinke |
| 2002/0042317 A1 | | 4/2002 | South |
| 2002/0099107 A1 | * | 7/2002 | Tucker et al. .................. 521/71 |
| 2002/0187869 A1 | | 12/2002 | Martin et al. |
| 2003/0219580 A1 | | 11/2003 | Tagge et al. |
| 2004/0012118 A1 | | 1/2004 | Perez et al. |
| 2006/0141918 A1 | | 6/2006 | Reinke |
| 2006/0148989 A1 | | 7/2006 | Burrowes et al. |
| 2006/0148990 A1 | * | 7/2006 | Burrowes ............... C08L 23/16 525/192 |
| 2006/0163042 A1 | | 7/2006 | Vogt |
| 2006/0287148 A1 | * | 12/2006 | Wood ..................... C08L 23/16 474/260 |
| 2006/0287434 A1 | * | 12/2006 | Wood et al. .................. 525/192 |
| 2007/0207317 A1 | | 9/2007 | Willingham et al. |
| 2007/0232429 A1 | | 10/2007 | Knox |
| 2007/0249451 A1 | | 10/2007 | Wu et al. |

FOREIGN PATENT DOCUMENTS

| | | |
|---|---|---|
| EP | 0537462 | 9/1992 |
| EP | 0712891 | 5/1996 |
| EP | 1052425 | 11/2000 |
| EP | 1057865 | 12/2000 |
| EP | 1108750 | 12/2000 |
| EP | 1081180 | 3/2001 |

OTHER PUBLICATIONS

Honeywell pamphlate A-C® Oxidized Polyethylene 307A Jan. 2002, see www.acwax.com @ 2002 Honeywell International.*
European Search Report, completed Nov. 27, 2006.
European Search Report, completed Sep. 18, 2006.
Patent Abstracts of Japan, Publication No. 2000309655, Nov. 7, 2000.

* cited by examiner

*Primary Examiner* — Ling Choi
*Assistant Examiner* — Ronald Grinsted
(74) *Attorney, Agent, or Firm* — Alvin T. Rockhill

(57) ABSTRACT

The invention is directed to a method for treating a textile material with a crosslinkable high density polyethylene based elastomer compound, such treated material for use in reinforced elastomeric articles. In one embodiment, a crosslinkable high density polyethylene based elastomer compound is applied in particle form to a surface of a textile material having a plurality of interstices. The particles are of a size no greater than about 35 mesh and include a peroxide curing agent. Next, the particles are melted so as to impregnate the interstices of the textile material with the compound. Then, the compound is crosslinked in-situ via the peroxide curing agent. In one example, the rubber compound includes about 80 parts per hundred cross-linkable material (phcm) to 100 phcm crosslinkable high density polyethylene. The resulting textile material may be used as a facing fabric, e.g., in a reinforced elastomeric article, such as a toothed power transmission belt.

20 Claims, 1 Drawing Sheet

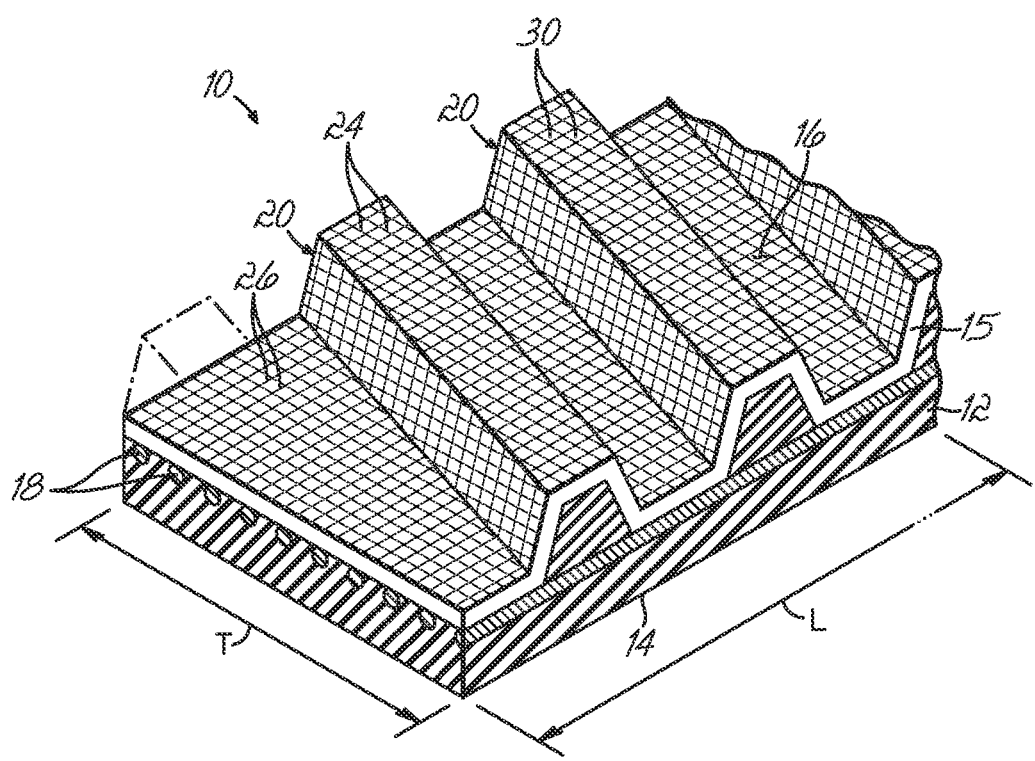

METHOD FOR TREATING TEXTILE MATERIAL FOR USE IN REINFORCED ELASTOMERIC ARTICLES

FIELD OF THE INVENTION

The present invention is directed to a method for treating a textile material with a crosslinkable high density polyethylene based elastomer compound, such treated material for use in reinforced elastomeric articles.

BACKGROUND OF THE INVENTION

A number of methods for treating a length of textile material, which may be used in reinforced elastomeric products, e.g., a transmission belt, exist in the prior art. One such method involves coating one side of a textile material with low viscosity liquid cement, such as to provide a durable textile material. The low viscosity liquid cement, which can flow at least partially into the fabric, may be prepared by dissolving a small amount of crosslinkable rubber in a suitable solvent. However, when the fabric interstices are filled, removal of the solvent results in shrinkage of the cement and the creation of undesirable voids in the rubber within that fabric. Additional coats of cement can be applied to the same other side of the textile to reduce the voids. The additional coats may use cement containing the same, or a different rubber than the first coat to obtain desired properties on each side of the textile or to improve adhesion to the reinforced elastomeric product. This solvent process only works for soluble rubbers, or for material that can be suspended in the solvent. For example, thermoplastics, such as polyethylene, may not be soluble in typical rubber solvents at atmospheric pressure and suitable temperatures. In addition, solvent evaporation and/or removal is an additional step in this fabric processing and can require additional machinery to handle the solvent. Also, solvent use and the removal and possible incineration of the solvent undesirably increases the energy content, cost and carbon footprint of this process.

Another method for treating a length of textile material includes calendaring crosslinkable rubber compounds onto the textile material. The rubber and textile pass through a small gap between calendar rolls where the rubber is pressed onto the textile with high pressure applied for a short time. Even when softened by heat and shear, the unvulcanized compound has a significant elastic component of viscoelasticity that reduces penetration into the textile material. Thus, the calendared compound can penetrate only the larger interstices of the textile material, and not the smaller interstices. In addition, this process only works for millable elastomers, i.e., those elastomers that can form a continuous mass when subjected to the shear stress applied by the calendar.

Yet, another method includes extruding thermoplastic elastomers onto textile material. In this process, the thermoplastic is melted in an extruder by heat and shear. To reduce viscosity and pressure, the temperature is often well above the melting point of the thermoplastic. The melted thermoplastic then passes as a fluid into a die, which forms the thermoplastic into a film or sheet of suitable thickness. The die may be a coat hanger die or other design suitable for creating the desired shape of the melt stream, which is laid on the fabric or pressed into the fabric by die pressure. However, the flow of the melt in the extruder and die is not uniform for all of the melt. Some portions move faster and some much slower than the average flow. While this process works well for non-crosslinkable materials, it is not suitable for crosslinkable thermoplastics, for example, because the residence time at temperature of the slower moving material exceeds the safe processing time and the material starts to prematurely cross-link.

Accordingly, there is a need for a process to apply crosslinkable thermoplastic elastomer compounds to textile materials which does not use solvents yet achieves penetration into the small interstices of the material, such treated material for use in reinforced elastomeric articles.

SUMMARY OF THE INVENTION

The present invention is directed to a method for treating a textile material with a crosslinkable high density polyethylene based elastomer compound, such treated material for use in reinforced elastomeric articles.

In one method for treating the textile material for use in a reinforced elastomeric article, a crosslinkable high density polyethylene based elastomer compound is applied in particle form to a surface of a textile material having a plurality of interstices. The particles are of a size no greater than about 35 mesh and include a peroxide curing agent. Next, the particles are melted without crosslinking the compound so as to impregnate the interstices of the textile material with the compound. Then, the compound is crosslinked in-situ via the peroxide curing agent.

In another method, a crosslinkable high density polyethylene based elastomer compound is evenly deposited in particle form on a surface of a textile material having a plurality of interstices. The compound includes about 80 parts per hundred cross-linkable material (phcm) to 100 phcm crosslinkable high density polyethylene, and the particles are of a size no greater than about 35 mesh and include a peroxide curing agent. Next, the particles are heated to at least the melting point temperature but less than the crosslinking temperature of the compound for a sufficient period of time to melt the particles and impregnate the textile material with the compound. Then, the compound is heated to at least the crosslinking temperature of the compound for a sufficient period of time to cross-link the impregnated compound in-situ via the peroxide curing agent.

The resulting textile material includes a length of textile material having a plurality of interstices filled with a cross-linked high density polyethylene based elastomer compound. Such compound is cross-linked in situ and, in one example, includes greater than 95 phcm crosslinkable high density polyethylene and a peroxide curing agent. In another example, the compound includes between greater than 95 phcm to about 99 phcm crosslinkable high density polyethylene and less than 5 phcm to about 1 phcm solid rubbery polymer. The textile material may be used, for example, in a reinforced elastomeric article, such as a belt, e.g., a toothed power transmission belt.

By virtue of the foregoing, there is provided a method for treating a textile material with a crosslinkable high density polyethylene based elastomer compound, wherein the process does not use solvents yet achieves penetration into the small interstices of that material, such treated material for use in reinforced elastomeric articles.

BRIEF DESCRIPTION OF THE DRAWING

The accompanying drawing, which is incorporated in and constitute a part of this specification, illustrates an embodiment of the invention and, together with the general description of the invention given above, and detailed description given below, serves to explain the invention.

The FIGURE is a perspective view of a cut-away portion of a toothed power transmission belt.

DETAILED DESCRIPTION

Methods for treating a textile material with a crosslinkable high density polyethylene based elastomer compound are disclosed. The treated material can be used in reinforced elastomeric articles including conveyor belting and power transmission products, such as power transmission belts, timing belts, and the like. A toothed power transmission belt 10 is illustrated in the FIGURE. Other belt types are contemplated, such as v-belts like that shown and described in U.S. Patent Application Publication No. 2006/0287148 entitled "Fabric Treatment for Reinforced Elastomeric Materials", which is expressly incorporated by reference herein in its entirety.

In the FIGURE, the belt 10 has an elastomeric body 12 with an outer surface 14 and a facing fabric 15 with an inner toothed surface 16. The body 12 is made of a resilient elastomer, e.g., hydrogenated acrylonitrile-butadiene rubber or acrylonitrile-butadiene rubber, and reinforced with longitudinal tensile members 18 that lie along the belt longitudinal direction L. The inner toothed surface 16 has at least one row of adjacent rows of teeth 20. The outer surface 14 of the belt 10 may also be formed with teeth (not shown), forming a dual sided belting, as is known in the art. The facing fabric 15 includes a textile material, or fabric, defined by warp yarns 24 and weft yarns 26 woven together. The warp yarns 24 extend in the transverse direction T while the weft yarns 26 extend in the longitudinal direction L. Alternatively, the textile material may have the warp and weft yarns inclined at other angles, i.e. a bias cut fabric. The textile material includes a plurality of variably sized interstices 30, or openings, between the yarns 24, 26 that are filled, or impregnated, with a cross-linked high density polyethylene based elastomer compound. The textile material and crosslinkable high density polyethylene based elastomer compound together define facing fabric 15, which provides a desirable level of reinforcement for the teeth 20 of the belt 10. The facing fabric can reduce stresses in the elastomeric body 12 of the teeth 20 of the belt 10, and achieve desirable resistance to oil, ozone, and abrasive wear, and desirably control the coefficient of friction.

As explained further below, to securely adhere the facing fabric 15 to the body 12 of the belt 10, the crosslinkable high density polyethylene based elastomer compound that fills the interstices of the textile material is generally cured along with the body 12 of the belt 10. Along with filling the interstices 30, the crosslinkable high density polyethylene based elastomer compound further encapsulates the individual fibers or fiber bundles of the yarns to reduce internal wear that occurs when fibers move or flex while in contact with adjacent fibers. One or more intervening layers (not shown) may optionally be situated between the facing fabric 15 and body 12, such as to satisfactorily adhere the body to the facing fabric 15. The inner surface 16 of the facing fabric 15 may also be coated to further achieve desirable resistance to oil, ozone, and abrasive wear and to control the coefficient of friction.

The textile material, such as for use as facing fabric 15, is generally abrasion resistant and can be a one-ply or multi-ply layer of fabric, which may be woven, knitted, needled, matted or non-woven, or includes a plurality of individual cords and nominal weft threads maintaining a spacing of the individual cords. In accordance with an embodiment of the invention, to treat the textile material, a length of desired textile material is provided. Then, in particle form, a crosslinkable high density polyethylene based elastomer compound is applied, for example, evenly deposited, at room temperature without solvent on the inner surface 16 of the textile material, such as by using a doctor blade or a flocking machine as is known in the art. The particles generally are of a size no greater than about 35 mesh and include a peroxide curing agent. In another example, the particles are of a size no greater than about 35 mesh and no less than about 170 mesh. In yet another example, the particles are about 50 mesh to about 120 mesh. A minimum size of 170 mesh is preferred to reduce dust and material loss in handling the particles. The maximum mesh size affects the ability to distribute the particles, and affects the uniformity of distribution of curing agent, i.e., peroxide curing agent, when powder particles of neat (pure) high density polyethylene, e.g., are coated therewith to make a crosslinkable high density polyethylene based elastomer compound.

The crosslinkable high density polyethylene based elastomer compound, prior to cure, has a complex dynamic viscosity of less than 5 McP (5,000 N*s/m$^2$) for at least 2 minutes at a maximum flow temperature $T_F$. $T_F$ max is herein defined as the maximum temperature at which the complex dynamic viscosity of the elastomer compound, when compounded with vulcanizing materials and prior to vulcanization, remains less than 5,000,000 centipoise (5,000 N*s/m$^2$) for at least 2 minutes. The viscosity is measured by a Rubber Process Analyzer, Model No. 2000 by Alpha Technologies, applying 0.5 degree strain at 60 cps, which results in 14% P-P sinusoidal strain and shear rate of 0.438 inverse seconds. The complex viscosity includes the elastic and viscous components of stress arising from the sinusoidally imposed strain, and includes the yield stress for elastomers exhibiting plastic or Bingham flow properties. The elastomer compound which meets this definition has a very low viscosity compared to those compounds which are defined by a Mooney viscosity at a flow temperature $T_F$ in the range of 93° C.-154° C., or at least the melting point of the compound to 154° C. The onset of vulcanization may be present at $T_F$ max, but practical vulcanization preferably begins at vulcanization temperatures, $T_V$, greater than 149° C.

Particle size and the complex dynamic viscosity of the elastomer compound aid the compound in impregnating the textile material. While particle size may permit the unmelted particles to fall into the larger interstices of the facing fabric 15, the complex dynamic viscosity and wetting properties permit the melted crosslinkable high density polyethylene based elastomer compound to flow into smaller and deeper cavities. Viscous flow rate depends on shear stress, which is usually a result of applied pressure, elapsed time for which the stress is applied, and the viscosity of the flowing material.

After deposition, the particles are heated to at least the melting point temperature but less than the crosslinking temperature of the compound for a sufficient period of time to melt the particles and impregnate the textile material with the compound. The heating temperature should avoid damaging the textile material. In one example, the compound is heated between 132° C. to 154° C. for at least two minutes to melt the particles and impregnate the textile material with the compound. Heating may occur in an oven or mold, for example, using radiant or convection heating, as is known in the art. Heating may occur prior to actually forming the uncured reinforced article, such as belt 10, or may occur prior to curing an assembled belt.

Pressure may also be applied to the surface of the textile material to assist with impregnating the textile material. Pressure may be applied by a press or roll, which may also provide heating. The magnitude and duration of the pressure should create a shear stress sufficient to cause viscous flow into the particular geometry of the various sized interstices 30 in the fabric. The duration of the pressure applied may be only a few milliseconds at economical processing speeds, so the applied pressure may be high. Alternatively, a lower pressure of longer duration can cause sufficient flow to fill the interstices of the textile material. As an example, a pressure of 250 psi applied for 2 minutes to inner surface 16, which includes particles of the elastomer compound, provides the desired penetration thereof into a typical textile material for use as facing fabric 15.

Other penetration pressure applying methods include bagging and autoclaving the textile material already treated with the particles. The pressure can also be applied when the textile material, with its deposited particles, is vulcanized by keeping the vulcanization temperature below $T_F$ max for 2 to 5 minutes while the pressure is applied, then increasing the temperature to complete the vulcanization via the peroxide curing agent. It should be noted that if the textile material being covered with the crosslinkable high density polyethylene elastomer compound is a cord, as opposed to fabric, the pressure needed to impregnate the cord may be different than that required for treating the fabric.

The inner surface 16, which includes the deposited elastomer compound, may optionally be covered with a wear layer (not shown), such as a thin film of UHMWPE or polypropylene prior to melting of the particles. Upon melting of the particles, the wear layer becomes securely adhered to the inner surface 16. The wear layer can also serve as a mold release layer during subsequent curing of the impregnated textile material in contact with a mold. In another example, a barrier coating, which includes a material compatible to the elastomeric material of the body 12 to securely adhere the body to facing fabric 15, optionally may be already applied on a surface opposite inner surface 16. In one example, the barrier coating may be calendared, applied as a film, or as a cement so as to be partially impregnated in the textile material prior to partial impregnation of the particles of crosslinkable high density polyethylene based elastomer compound. The barrier coating can improve adhesion of the facing fabric 15 to the body 12 and act as a barrier to excess flow of the crosslinkable high density polyethylene based elastomer compound. The barrier coating can include, for example, a diene based thermoplastic polyurethane, such as Sartomer PRO7840 available from Sartomer Company, Inc. of Exton, Pa. Accordingly, the melted particles of the elastomer compound only partially fill the textile material. This may be beneficial when the material for the body 12 does not bond well with the crosslinkable high density polyethylene based elastomer compound.

After impregnation, the textile material may be used immediately in a manufacturing process or cooled and stored. The textile material may be pre-formed into a desired shape prior to cooling, such as to conform to a toothed mold for making belt 10. The textile material, at this stage, also may be wound onto storage rolls. Next, the impregnated textile material eventually is heated to at least its crosslinking temperature for a sufficient period of time to cross-link the impregnated compound in-situ. Heating to cure may occur in an oven, autoclave, or mold as is known in the art. Pressure may accompany curing.

Generally, the impregnated textile material is assembled with body 12, as well as other contemplated components, and then cured together by conventional curing means and methods known in the art to define belt 10. For example, for belt 10, the facing fabric 15 is typically sewed or ultrasonically bonded into a flexible cylinder that fits around a toothed mold. The facing fabric 15 is placed around the mold such that the inner surface 16 of the facing fabric 15 is against the mold. Longitudinal tensile members 18 are wound around the facing fabric and the body 12 placed thereon. The assembled belt 10, including the impregnated textile material, is cured in a conventional manner by heat from the inside of the mold and by heat and pressure from an external diaphragm. As the temperature increases during cure, and prior to significant crosslinking, the crosslinkable high density polyethylene based elastomer compound melts, the textile material stretches and conforms to the teeth of the mold, and the body 12 flows to have intimate contact with the facing fabric 15. After curing, the body 12 is securely adhered to the facing fabric 15.

Concerning the crosslinkable high density polyethylene based elastomer compound, the elastomer compound includes about 80 parts per hundred cross-linkable material (phcm) to 100 phcm crosslinkable high density polyethylene. In another example, the elastomer compound includes about 80 phcm to about 99 phcm crosslinkable high density polyethylene. In yet another example, the elastomer compound includes greater than 95 phcm to about 99 phcm crosslinkable high density polyethylene. Cross-linkable material is herein defined as a material in a composition that chemically links with other material within the composition. For the purpose of this definition, co-agents and co-cures, such as peroxide, zinc dimethacrylate, zinc diacrylate, bis-maleimide, are not considered cross-linkable materials. Cross-linkable materials include conventional solid rubbery polymers, and crosslinkable high density polyethylene based elastomer compounds.

The crosslinkable high density polyethylene based elastomer compound includes a crosslinkable high density polyethylene. High density polyethylene molecules generally have between 700 and 1,800 monomer units per molecule. The crosslinkable high density polyethylene can include a functionalized high density polyethylene, such as an oxidized or maleated high density polyethylene.

The functionalized high density polyethylene may be prepared by methods known in the art. For example, an oxidized high density polyethylene may be obtained by oxidation of polyethylene in molten or finely divided solid form, with free oxygen containing gas, usually air, generally at elevated temperature, until the desired oxygen content is obtained. Examples of the crosslinkable high density polyethylene include oxidized polyethylenes and copolymers of polyethylene, such as ethylene maleic anhydride and ethylene-vinyl acetate copolymers, which can crosslink to increase the hardness and modulus of the elastomer, which in turn, can lead to improved belt properties. Crosslinkable polyethylenes are available from Honeywell International Inc. under the brand name A-CO polyethylene, including A-C 307®, 307A, 395, and 395A, which are oxidized polyethylenes, A-C® 400 and 400A, which are ethylene-vinyl acetate copolymers, and A-C® 575P and 575A, which are ethylene-maleic anhydride copolymers.

The crosslinkable high density polyethylene based elastomer compound may optionally include a solid rubbery polymer as an impact modifier. In one example, the solid rubber polymer is present in an amount of from about 1 phcm to about 20 phcm. In another example, the solid rubber polymer is present in an amount of less than 5 phcm to about 1 phcm solid rubbery polymer. The solid rubber polymer can include an ethylene-alpha olefin elastomer.

Examples of the ethylene-alpha-olefin elastomer include copolymers composed of ethylene and propylene units (EPM), ethylene and butene units, ethylene and pentene units, or ethylene and octene units (EOM), and terpolymers composed of ethylene and propylene units and an unsaturated component (EPDM), as well as mixtures thereof. As the unsaturated component of EPDM, non-conjugated diene may be used, including for example, 1,4-hexadiene, dicyclopentadiene or ethylidenenorbornene (ENB). In one example, the solid rubbery polymers is EPM and/or EPDM. The ethylene-alpha-olefin elastomer can further include from about 35% by weight to about 80% by weight of the ethylene unit, from about 65% by weight to about 25% by weight of the propylene or octene unit, and 0-10% by weight of the unsaturated component. In another example, the ethylene-alpha-olefin elastomer contains from about 55% to about 78% by weight of the ethylene unit, and in another example, the ethylene-alpha-olefin elastomer contains from about 65% to about 75% of the ethylene unit.

An organic peroxide is used as the curing agent to achieve the necessary cross-linking of the elastomer compound. For such a cure system, the amount of peroxide that is added is in the amount of 2-15 phcm, 5-15 phcm, or 5-10 phcm. Examples of suitable organic peroxides include dicumyl peroxide (Dicup), a,a'-bis(t-butylperoxy)diisopropylbenzene (Vulcup), t-butyl peroxybenzoate, di-t-butyl peroxide, and 2,5-dimethyl-2,5-di-t-butylperoxyhexane. The organic peroxide is generally selected to have an active range which is above the melt point of the crosslinkable high density polyethylene based elastomer compound to allow for melt processing prior to cross-linking and below temperatures which would damage the textile material.

The crosslinkable high density polyethylene based elastomer compound may also incorporate coagents such as maleimides, cyanurates, and/or metal salts of alpha,beta-unsaturated organic acids. In one example, the maleimide may be N,N'-m-phenylenedimaleimide (HVA-2, available from Dupont, or Vanax MBM, available from Vanderbilt). In one example, the cyanurate may be triallyl cyanurate. Examples of suitable metal salts of alpha,beta-unsaturated organic acids include metal salts of acids such as for example, acrylic, methacrylic, maleic, fumaric, ethacrylic, vinyl-acrylic, itaconic, methyl itaconic, aconitic, methyl aconitic, crotonic, alpha-methylcrotonic, cinnamic, and 2,4-dihydroxy cinnamic acids. These salts may be of zinc, cadmium, calcium, magnesium, sodium or aluminum. In one example, the metal salts of alpha,beta-unsaturated organic acid is zinc diacrylate or zinc dimethacrylate. Amounts of the coagent may range from about 1 to about 30 phcm, or from about 5 to about 20 phcm.

The crosslinkable high density polyethylene based elastomer compound may further include, for example, reinforcing filler such as carbon black, carbon fiber, carbon nanotubes, calcium carbonate, talc, clay or hydrated silica, or mixtures thereof, as well as other additives, such as tougheners, antioxidants, and/or pigments, in conventional amounts, as long as the physical properties of the rubber compound required for treating the textile material are not adversely affected.

The mixing of the crosslinkable high density polyethylene based elastomer compounds can be accomplished by methods known to those having ordinary skill in the art. For example, the ingredients, but for the peroxide, are typically mixed in the first zones of a multi-zone compounding extruder at a temperature above the melting temperature of the high density polyethylene. In the absence of the peroxide, the temperature may also be above the vulcanization temperature of the finished compound. The melted material is cooled in subsequent zones to a temperature still above the melt point and at which temperature the half life of the peroxide is long enough to prevent significant crosslinking in the remaining mixing zones. The peroxide is intimately mixed with the melt at this temperature and the melt is extruded through a die and cooled to form a solid strand or pellet which is ground to the required particle size distribution.

Alternatively, the ingredients, but for the peroxide, are mixed in at least two stages, namely, one non-productive stage, which excludes the peroxide and which creates a non-crosslinkable intermediate material, followed by a productive mix stage at a lower temperature wherein the peroxide is intimately mixed with the melt. The terms "non-productive" and "productive" mix stages are well known to those having skill in the rubber mixing art. The traditional intimate mixing of the peroxide is not always necessary to achieve appropriate crosslinking of the non-productive intermediate material. Within certain limits of particle size, the peroxide need only be evenly dispersed among the particles of the non-productive. This is believed to be due to the high mobility of the free radicals generated by the peroxide, compared to the mobility of the peroxide molecule itself. This allows the peroxide to be mixed with the non-productive powder below the melt point of the powder, reducing the risk of premature crosslinking and using lower cost mixing methods. For liquid peroxide, the mixing can be at room temperature. For common solid peroxide like dicumyl peroxide (Dicup) or a,a'-bis(t-butylperoxy)diisopropylbenzene (Vulcup), the mixing is best achieved above their respective melts points. Even so, the mixing temperature may be in a range of 37° C. to 60° C., compared to a typical polyethylene melt temperature of 132° C. or more. The peroxide half-life at 60° C. or lower is many times longer than that at 132° C., preventing premature crosslinking during mixing at the lower temperature.

A non-limiting example of a crosslinkable high density polyethylene based elastomer compound in accordance with the present invention is disclosed below.

In this example, the crosslinkable high density polyethylene based elastomer compound has two components. The first component is a functionalized high density polyethylene, i.e., Honeywell AC307A, which is an oxidized high density polyethylene with particle sizes of about 40 mesh. This component is present in an amount of 100 phcm. The second component is a neat organic peroxide, i.e., a,a'-bis(t-butylperoxy)diisopropylbenzene, available as Varox VC-R by R.T. Vanderbilt, which is present in an amount of about 10 phcm or 9.09 wt %.

With regards to mixing, the particles may be placed in a low shear mixer such as a ribbon blender or a fluidizing blender, such as a Henschel mixer. The particles can be heated from an external source of heat or by the mixing action to above the melt point of the peroxide, if necessary, yet below the activation temperature of the peroxide. In this example, components were mixed in a Henschel mixer for about 10 minutes, rising from room temperature to about 46° C. without addition of external heat. Within the limits of solubility of the peroxide in the high density polyethylene powder, the peroxide may be partially absorbed by the particles, with the remaining peroxide coating the particle surfaces. The particles may be used as-is, or may be cooled before use. If the peroxide is a solid at room temperature, the powder may form friable lumps due to the adhesion between particles. The lumps can be easily returned to free-flowing powder by low shear mixing below the melt point of the peroxide. This two-component system does not have a non-productive mix step. This process can also be used with compounded non-productive powder in place of the AC307A powder when some of the ingredients must be intimately mixed into melted polyethylene.

Alternately, the components can be mixed in an extruder or other high shear mixing device above the melt point of the high density polyethylene, as long as the residence time and melt temperature do not start crosslinking the high density polyethylene. This can be achieved if the peroxide is introduced near the end of the extruder and the die design has a short path with no dead or slow flow areas.

The productive mix is extruded, and the extrudate may be in the form of strings or pellets, the specific configuration dependent upon the machinery. The vulcanizable product, i.e., oxidized high density polyethylene based elastomer compound, is then prepared to coat any reinforcing means. In particular, the compound is ground into particles having the mesh size as discussed above, e.g., no greater than about 35 mesh. The particle form of the crosslinkable high density polyethylene based elastomer compound may then be applied to a textile material, as fully described above, to form facing fabric 15 for use in belt 10.

In another example, carbon black can be added to the powder blend if the shear rate of the mixer is sufficient to break up the compacted particles of carbon black. In one example, about 5 phcm or 4.3 wt % of carbon black may be added. The melted peroxide sticks the carbon black to the surface of the high density polyethylene particles and eliminates the dust associated with fine carbon black. The carbon black remains at the grain boundaries unless flow into the fabric creates enough shear to blend it further. Conductive carbon black mixed this way can reach conductivity percolation levels at a lower average concentration than if it were intimately mixed.

The cured properties can be even further improved when curing co-agents, for example, are added to the compound. When the co-agent is a solid, the co-agent is intimately mixed with melted high density polyethylene using the extrusion and regrind process described above. Other materials like impact modifiers, tougheners, antioxidants, pigments or fillers can also be added to the melt. In one example, about 8 phcm or 6.7 wt % of coagent, e.g., HVA2, may be added to the melt. In another example, 8 phcm of TMPTMA (trimethylolpropane trimethacrylate) may be added to the powder blend to reduce the evaporation of this volatile liquid that would occur when mixed at the higher melt temperature.

The above treatment method provides for desirable penetration into the interstices 30 of the textile material, e.g., a fabric or cord, and encapsulation of filaments, yarns, and/or fabrics. There is thus provided a method for treating a textile material with a crosslinkable high density polyethylene based elastomer compound, wherein the process does not use solvents yet achieves penetration into the small interstices of the textile material, such treated material for use in reinforced elastomeric articles, e.g., belts.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A method for treating a textile material for use in a reinforced elastomeric article comprising:
   applying particles of a crosslinkable high density polyethylene based elastomer compound to a surface of a textile material having a plurality of interstices, the particles being of a size no greater than 35 mesh and consisting of (a) 95 phcm to 99 phcm of the crosslinkable high density polyethylene, (b) a peroxide curing agent, (c) optionally, a reinforcing filler, (d) optionally, a solid curing co-agent, (e) optionally, an antioxidant, and (f) optionally, a pigment, wherein the crosslinkable high density polyethylene based elastomer compound is deposited in particle form to the surface of the textile material;
   melting the particles without crosslinking the compound so as to impregnate the interstices of the textile material with the compound; and
   crosslinking the compound in-situ via the peroxide curing agent.

2. The method of claim 1, wherein melting the particles comprises heating the particles to at least the melting point temperature but less than the cross-linking temperature of the compound for a sufficient period of time to melt the particles and impregnate the textile material with the compound.

3. The method of claim 2, wherein the compound is heated for at least two minutes to melt the particles and impregnate the textile material with the compound.

4. The method of claim 1, wherein melting the particles comprises heating the particles to at least the melting point temperature but less than the cross-linking temperature of the compound for a sufficient period of time and applying pressure to the surface of the textile material to melt the particles and impregnate the textile material with the compound.

5. The method of claim 1, wherein crosslinking the compound comprises heating the compound to at least the crosslinking temperature of the compound for a sufficient period of time to crosslink the impregnated compound in-situ via the peroxide curing agent.

6. The method of claim 1, wherein the crosslinkable high density polyethylene is an oxidized high density polyethylene.

7. The method of claim 1, wherein the particles are of a size which is within the range of 170 mesh to 50 mesh.

8. The method of claim 1, wherein the crosslinkable high density polyethylene based elastomer compound is free from solvents.

9. The method of claim 1, wherein the crosslinkable high density polyethylene based elastomer compound has a complex dynamic viscosity of less than $5 \times 10^6$ cP ($5,000$ N*s/m$^2$) for at least 2 minutes at a maximum flow temperature $T_F$.

10. A textile material for use in a reinforced elastomeric article prepared by the method of claim 1.

11. The method of claim 1, wherein the crosslinkable high density polyethylene is a maleated high density polyethylene.

12. A method for treating a textile material for use in a reinforced elastomeric article comprising:
   applying particles of a crosslinkable high density polyethylene based elastomer compound to a surface of a textile material having a plurality of interstices, the particles being of a size no greater than 35 mesh and consisting of (a) 95 phcm to 99 phcm of the crosslinkable high density polyethylene and (b) a peroxide curing agent, (c) optionally, a solid rubbery polymer, (d) optionally, a reinforcing filler, (e) optionally, a solid curing co-agent, (f) optionally, an antioxidant, and (g) optionally, a pigment, wherein the peroxide curing agent is partially absorbed by the particles and/or coated onto the surfaces of the particles, and wherein the crosslinkable high density polyethylene based elastomer compound is deposited in particle form onto the surface of the textile material;

melting the particles without crosslinking the compound so as to impregnate the interstices of the textile material with the compound; and crosslinking the compound in-situ via the peroxide curing agent.

13. A method for treating a textile material for use in a reinforced elastomeric article comprising:

applying particles of a crosslinkable high density polyethylene based elastomer compound to a surface of a textile material having a plurality of interstices, the particles being of a size no greater than 35 mesh and comprising (a) 95 phcm to 99 phcm of the crosslinkable high density polyethylene and (b) a peroxide curing agent, wherein the crosslinkable high density polyethylene based elastomer compound is deposited in particle form to the surface of the textile material, and wherein the crosslinkable high density polyethylene based elastomer compound is void of solid ethylene-alpha olefin elastomers;

melting the particles without crosslinking the compound so as to impregnate the interstices of the textile material with the compound; and crosslinking the compound in-situ via the peroxide curing agent.

14. The method of claim 13, wherein melting the particles comprises heating the particles to at least the melting point temperature but less than the cross-linking temperature of the compound for a sufficient period of time to melt the particles and impregnate the textile material with the compound, and wherein the compound is heated for at least two minutes to melt the particles and impregnate the textile material with the compound.

15. The method of claim 13, wherein crosslinking the compound comprises heating the compound to at least the crosslinking temperature of the compound for a sufficient period of time to crosslink the impregnated compound in-situ via the peroxide curing agent.

16. The method of claim 13, wherein the crosslinkable high density polyethylene based elastomer compound has a complex dynamic viscosity of less than $5 \times 10^6$ cP (5,000 $N*s/m^2$) for at least 2 minutes at a maximum flow temperature $T_F$.

17. The method of claim 13, wherein the crosslinkable high density polyethylene is a maleated high density polyethylene.

18. The method of claim 13, wherein the particles are of a size which is within the range of 170 mesh to 50 mesh.

19. The method of claim 13, wherein the crosslinkable high density polyethylene based elastomer compound is free from solvents.

20. A textile material for use in a reinforced elastomeric article prepared by the method of claim 1.

* * * * *